United States Patent
Purreiter

(10) Patent No.: US 12,222,014 B2
(45) Date of Patent: Feb. 11, 2025

(54) VEHICLE UNIT FASTENING SUBASSEMBLY AND MODULAR SYSTEM

(71) Applicant: Bayerische Motoren Werke Aktiengesellschaft, Munich (DE)

(72) Inventor: Christoph Purreiter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 824 days.

(21) Appl. No.: 17/256,685

(22) PCT Filed: Jul. 25, 2019

(86) PCT No.: PCT/EP2019/069995
§ 371 (c)(1),
(2) Date: Dec. 29, 2020

(87) PCT Pub. No.: WO2020/035278
PCT Pub. Date: Feb. 20, 2020

(65) Prior Publication Data
US 2021/0310536 A1    Oct. 7, 2021

(30) Foreign Application Priority Data
Aug. 16, 2018 (DE) .................... 10 2018 213 775.7

(51) Int. Cl.
*F16F 13/18* (2006.01)
*B62D 21/11* (2006.01)

(52) U.S. Cl.
CPC ............ *F16F 13/18* (2013.01); *B62D 21/11* (2013.01); *F16F 2230/0005* (2013.01)

(58) Field of Classification Search
CPC .... F16F 13/18; F16F 2230/0005; B62D 21/11
See application file for complete search history.

(56) References Cited

U.S. PATENT DOCUMENTS

| 4,720,084 A * | 1/1988 | Hollerweger ........... F16F 13/26 267/140.13 |
| 4,738,434 A * | 4/1988 | Marjoram ............... F16F 13/18 267/140.13 |

(Continued)

FOREIGN PATENT DOCUMENTS

| CN | 1510326 A | 7/2004 |
| DE | 199 30 726 C1 | 1/2001 |

(Continued)

OTHER PUBLICATIONS

International Search Report (PCT/ISA/210) issued in PCT Application No. PCT/EP2019/069995 dated Nov. 29, 2019 with English translation (five (5) pages).

(Continued)

*Primary Examiner* — Thomas W Irvin
(74) *Attorney, Agent, or Firm* — Crowell & Moring LLP

(57) ABSTRACT

A vehicle unit fastening subassembly for vibratory fastening of a vehicle unit, in particular of a motor and/or transmission, to a vehicle structure of a motor vehicle, has at least one first carrier element on the unit side and a second carrier element on the vehicle side. The first carrier element and the second carrier element are connected to each other by a vibration damper, which is arranged at least in part in the first carrier element or in the second carrier element. The vibration damper is fluidically connected to a hydraulic unit by a flow channel, which is arranged adjacent to the vibration damper in a plan view of the vibration damper. A modular system is provided having a vibration damper and a hydraulic unit, wherein the vibration damper is usable either together with the hydraulic unit as a hydraulic vibration damper or without the hydraulic unit as a conventional bearing.

10 Claims, 4 Drawing Sheets

(56) References Cited

U.S. PATENT DOCUMENTS

| | | | |
|---|---|---|---|
| 4,762,306 A * | 8/1988 | Watanabe | F16F 9/34 |
| | | | 123/195 A |
| 4,784,378 A | 11/1988 | Ford | |
| 5,388,811 A * | 2/1995 | Marjoram | B60G 99/008 |
| | | | 267/140.13 |
| 5,810,336 A | 9/1998 | Gennesseaux | |
| 7,117,969 B2 * | 10/2006 | Miyamoto | B60K 5/1216 |
| | | | 180/300 |
| 10,525,813 B2 * | 1/2020 | Genderjahn | F16F 13/105 |
| 2004/0182631 A1 | 9/2004 | Miyamoto et al. | |
| 2018/0290532 A1 | 10/2018 | Genderjahn et al. | |
| 2021/0155090 A1 * | 5/2021 | Chauvet | F16F 15/023 |

FOREIGN PATENT DOCUMENTS

| | | |
|---|---|---|
| DE | 10 2015 224 937 A1 | 6/2017 |
| EP | 0 178 934 A2 | 4/1986 |
| EP | 0 224 355 A2 | 6/1987 |
| EP | 0 787 924 B1 | 8/2001 |
| GB | 2 165 804 A | 4/1986 |
| JP | 56-120838 A | 9/1981 |
| WO | WO 2008/006526 A2 | 1/2008 |

OTHER PUBLICATIONS

German-language Written Opinion (PCT/ISA/237) issued in PCT Application No. PCT/EP2019/069995 dated Nov. 29, 2019 (seven (7) pages).

German-language Search Report issued in German Application No. 10 2018 213 775.7 dated May 27, 2019 with partial English translation (15 pages).

Chinese-language Office Action issued in Chinese Application No. 201980039187.7 dated Nov. 29, 2021 with English translation (15 pages).

* cited by examiner

VEHICLE UNIT FASTENING SUBASSEMBLY AND MODULAR SYSTEM

BACKGROUND AND SUMMARY OF THE INVENTION

The present invention relates to a vehicle unit fastening subassembly for securing a vehicle unit in a vibratory manner, in particular an engine and/or a transmission, to a vehicle structure of a motor vehicle, and to a modular system having a vibration damper.

Hydraulic bearings are known for supporting vehicle units in a vibratory manner. These are used at the same time to secure a vehicle unit, for example, to a body and to decouple the vibrations of the vehicle unit. Generally, the hydraulic bearings are prefabricated as a unit. Since such hydraulic bearings have a specific structural height as a result of the presence of the hydraulic unit, they can be used only when there is sufficient structural space available. Particularly in the region of the engine and the transmission, the structural space relationships often present a challenge.

An object of the present invention is consequently to provide a vehicle unit fastening subassembly for securing a vehicle unit to a vehicle structure of a motor vehicle in a vibratory manner, which is optimized in terms of the requirements placed on structural space.

This object is achieved according to the invention by a vehicle unit fastening subassembly for securing a vehicle unit in a vibratory manner, in particular an engine and/or a transmission, to a vehicle structure of a motor vehicle, having at least a unit-side first carrier element and a vehicle-side second carrier element, wherein the first carrier element and the second carrier element are connected to each other by way of a vibration damper which is arranged at least partially in the first carrier element or in the second carrier element, wherein the vibration damper is connected in terms of flow by a flow channel to a hydraulic unit which, when the vibration damper is viewed from above, is arranged beside the vibration damper. In particular, the vibration damper and the hydraulic unit are, when the vibration damper is viewed from above, arranged so as not to overlap. A view of the vibration damper from above is intended to be understood to be a view in an axial direction of the vibration damper. The axial direction is the direction in which, in the installed state of the subassembly according to the invention, the main load is introduced into the vibration damper when the vehicle is in the idle state and the engine is at a standstill.

As a result of the arrangement of the hydraulic unit beside the vibration damper, the structural height of the vehicle unit fastening subassembly is advantageously reduced so that the fastening subassembly can be integrated in a simpler manner into a structural space environment depending on the structural space situation.

The vibration damper further transmits the bearing forces which are introduced from the vehicle unit into the vehicle structure.

In addition, with the vehicle unit fastening subassembly a central connection possibility is provided by the vibration damper. The introduction of a transverse force into the vehicle body and/or the vehicle unit under torque loading is thereby prevented to the greatest possible extent.

The vehicle-side carrier element is, for example, securely connected to the vehicle body. For example, the vehicle side carrier element is a transmission cross-member. The unit-side carrier element may be securely connected to the vehicle unit or may be a component of the vehicle unit.

According to an embodiment, the vibration damper comprises a bearing core and a suspension spring, in particular a suspension spring which at least partially surrounds the bearing core. The bearing core is preferably produced from a dimensionally stable material, for example, metal, whilst the suspension spring may be produced from a resilient material. The vibration damper thus has the necessary dimensional stability or the vibration damper can ensure a stable bearing and at the same time absorb vibrations sufficiently.

In a particularly preferred manner, the suspension spring is vulcanized on the bearing core. In this manner, the connection between the suspension spring and the bearing core may be particularly stable and durable.

The carrier element which receives the vibration damper may have two adjacent recesses, in one the vibration damper is received and in the other the hydraulic unit is received, wherein the recesses are covered at least at one side by a cover which together with the associated carrier element forms at least a portion of the flow channel. The flow channel may consequently be formed in a simple manner by securing the cover. At the same time, the cover retains the vibration damper and the hydraulic unit in a non-releasable manner in the carrier element. On the whole, the fastening subassembly can thereby be constructed in a particularly simple and cost-effective manner.

In addition, the flow channel may be formed partially by the hydraulic unit, in particular by means of a nozzle channel of a nozzle plate of the hydraulic unit.

At least the recess in which the vibration damper is received can be constructed to be continuous in an axial direction of the vibration damper. The vibration damper can thereby protrude in the direction toward the second carrier element from the first carrier element so that the second carrier element can be connected to the first carrier element in a simple manner in order to support a vehicle unit in a vibratory manner.

In this case, the recess which receives the vibration damper is preferably constructed in a stepped manner, wherein, as a result of the step, a stop for the vibration damper in an axial direction of the vibration damper is formed in order to retain the vibration damper in a non-releasable manner in the carrier.

According to an embodiment, the vibration damper and the hydraulic unit are mounted together in a separate housing which is secured to one of the carrier elements. This embodiment has the advantage that the vibration damper and the hydraulic unit can be preassembled in the separate housing and can consequently be provided as a prefabricated subassembly and mounted in one of the carrier elements. The handling during the final assembly is thereby facilitated and the cycle time for the assembly of the vehicle unit fastening subassembly can thereby be reduced. For example, the vibration damper and the hydraulic unit can already be delivered in a pre-assembled state. Furthermore, maintenance or a replacement of the vibration damper and the hydraulic unit can thereby be simplified.

The vibration damper is, for example, supported by a bearing ring on the carrier element or the separate housing. As a result of the bearing ring, the vibration damper can be retained in the carrier element in a defined position when the cover is secured to the carrier element. In particular, the vibration damper is retained at an axial end by the bearing ring.

The bearing ring is preferably securely connected to the vibration damper, for example, by the suspension spring being vulcanized on the bearing ring.

According to an embodiment, the bearing ring may be formed in such a manner that it further forms at least a portion of the hydraulic unit, in particular at least a portion of a nozzle plate with a nozzle channel. In this manner, the vehicle unit fastening subassembly may have a particularly small number of components and thereby be able to be produced in a particularly cost-effective manner.

In particular, a portion of the bearing ring together with a portion of the cover forms a multi-component nozzle plate.

According to an embodiment, the flow channel extends in a substantially linear manner between the vibration damper and the hydraulic unit. In this manner, occurrences of flow turbulence of a hydraulic fluid in the flow channel can be prevented. The hydraulic unit may in this instance be subjected to flow from below when pressure is applied to the suspension spring.

Alternatively, the flow channel may have a step between the vibration damper and the hydraulic unit. In this instance, the hydraulic unit can be subjected to flow from above when pressure is applied to the suspension spring.

The bearing core may be part of a stop system, wherein the bearing core can strike at least one of the two carrier elements. In particular, the bearing core can strike the carrier element in which the bearing core is received. In this instance, the bearing core does not have to come into direct contact with the carrier element, but instead the bearing core may also be covered by the material of the suspension spring at the contact location.

Preferably, the bearing core is cross-shaped or T-shaped when viewed as a longitudinal section. In this manner, when the vibration damper is moved in an axial direction and/or in a radial direction, a suitable stop is provided. However, other geometries of the bearing core are also conceivable, for example, spherical or parallelepipedal geometries.

The hydraulic unit may comprise a diaphragm which is moved during travel operation by a hydraulic fluid which is present in the vehicle unit fastening subassembly. This has a positive effect on the acoustics of the vehicle unit fastening subassembly.

The invention is further solved by a modular system having a vibration damper and a hydraulic unit, wherein the vibration damper may optionally be used together with the hydraulic unit as a vehicle unit fastening subassembly as described above, in particular as a hydraulic vibration damper, or without the hydraulic unit as a bearing for securing the vehicle unit to the vehicle structure. Consequently, the vibration damper can be used in a particularly flexible manner. The fact that the vibration damper can equally be used in different bearing situations may also have a positive effect on the overall production costs of a vehicle. In particular, variant costs can be reduced.

Other advantages and features of the invention will be appreciated from the following description and from the following drawings, to which reference is made. In the drawings.

DETAILED DESCRIPTION OF THE DRAWINGS

Figure 1:
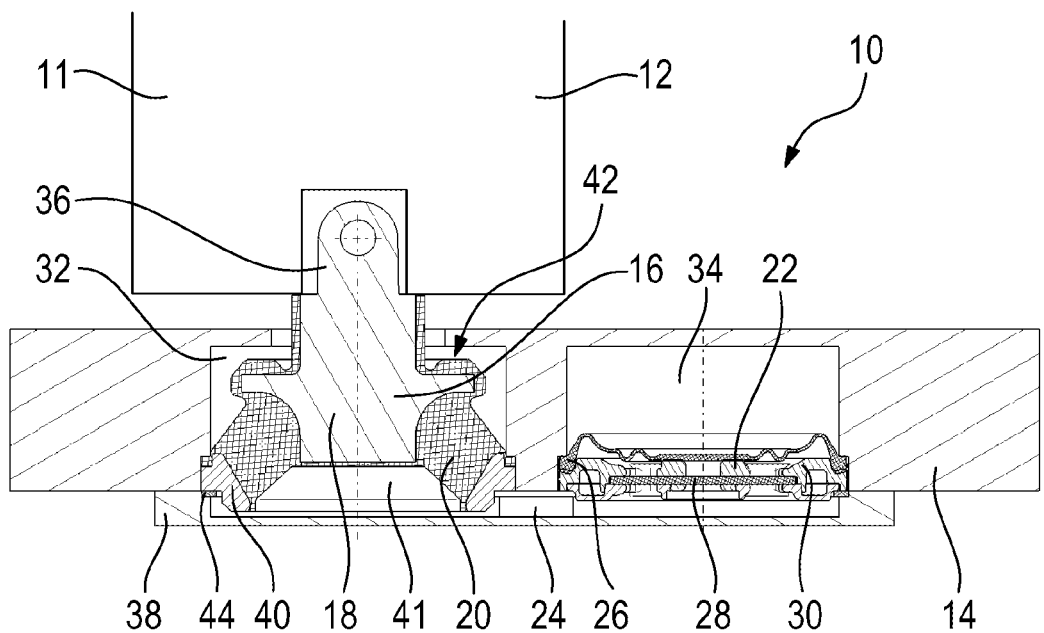
FIG. 1 is a sectioned illustration of a vehicle unit fastening subassembly according to an embodiment of the invention.

FIG. 1 is a sectioned illustration of a vehicle unit fastening subassembly 10. The vehicle unit fastening subassembly 10 is suitable for securing a vehicle unit 11, in particular an engine and/or transmission, to a vehicle structure of a motor vehicle in a vibratory manner.

The vehicle unit fastening subassembly 10 comprises a unit-side carrier element 12 and a vehicle-side carrier element 14 and a vibration damper 16 which connects the two carrier elements 12, 14 to each other in terms of forces and at the same time damps relative movements.

The vibration damper 16 comprises a bearing core 18 and a suspension spring 20. The suspension spring 20 preferably comprises a resilient material. The vibration damper 16 can thereby become deformed during travel operation and can absorb the vibrations of the vehicle unit 11 during travel operation.

The unit-side carrier element 12 is, for example, a component of the vehicle unit 11, in particular a housing of the vehicle unit 11.

The vehicle-side carrier element 14 is, for example, an engine carrier or a transmission cross-member.

In the embodiments shown, the vibration damper 16 is partially supported in the vehicle-side carrier element 14, in particular the carrier element 14 is used as a receiving housing for the vibration damper 16. In principle, the vibration damper 16 may also be supported in the unit-side carrier element 12.

In addition to the vibration damper 16, when the vibration damper 16 is viewed from above, a hydraulic unit 22 is arranged. As can be seen in the Figures, a structural height in an axial direction is thereby reduced so that the fastening subassembly 10 can be readily installed in structural spaces with small spatial relationships in a vertical direction.

The vibration damper 16 and the hydraulic unit 22 are connected to each other in terms of flow by means of a flow channel 24 in which a hydraulic fluid is present. In the embodiment shown in FIG. 1, the flow channel 24 extends in a linear manner between the vibration damper 16 and the hydraulic unit.

The hydraulic unit 22 comprises a rolling bellows 26, a diaphragm 28 and a nozzle plate 30 which may be in one piece or several pieces. The rolling bellows 26 may become deformed in order to receive a hydraulic fluid which is displaced as a result of a movement of the vibration damper 16. Furthermore, the rolling bellows 26 seals the hydraulic unit 22 in the direction toward the carrier element 14.

As a result of a vibration damper 16 in combination with a hydraulic unit 22, a vehicle unit can be supported in a particularly advantageous manner. In this instance, the vibration damper takes on the support of the entire static weight of the vehicle unit 11 and, in combination with the hydraulic fluid, vibrations in the case of relative movements between the vehicle unit and a vehicle structure are damped in a particularly effective manner.

In order to support the vibration damper 16 and the hydraulic unit 22 in a reliable manner which is optimized in terms of structural space, recesses 32, 24 in the form of pockets which are freely constructed in geometric terms are provided in the carrier element 14, wherein the vibration damper 16 and the hydraulic unit 22 are arranged in each case in a recess 32, 34. In this instance, the recess 32 which receives the vibration damper 16 extends continuously in an axial direction through the carrier element 14. The recess 32 is stepped in order to support the vibration damper 16 in a non-releasable manner. In addition, the axial recess 32 enables the required freedom of movement in the axial direction, in the longitudinal direction and in the transverse direction of the vibration damper 16 when the vibration damper 16 is correctly mounted in the carrier element 14.

The vibration damper 16 protrudes, at least at a side directed toward the unit-side carrier element 12, out of the carrier element 14, in particular out of the recess 32. In particular, a securing portion 36 of the vibration damper 16 protrudes from the carrier element 14. The vibration damper 16 can thus be connected to the carrier element 12 in a simple manner, for example, by means of screws.

At a side facing away from the carrier element 12, the recesses 32, 34 are covered by a cover 38. The cover 38 may be secured to the carrier element 14 in a suitable manner, for example, by means of screwing, adhesive-bonding, fitting, locking or some other means.

The cover 38 forms together with the carrier element 14 the flow channel 24 and can further be used to secure the vibration damper 16 to the carrier element 14.

In order to be able to secure the vibration damper 16 to the carrier element 14 in a simple manner, a bearing ring 40 is provided. This ring 40 is connected to the vibration damper 16 by means of the suspension spring 20 which is in particular vulcanized on the bearing ring 40.

The bearing ring 40 can be secured to the carrier element 14 in an appropriate manner, for example, by means of screwing, adhesive-bonding, fitting or locking. In the embodiment shown, the bearing ring 40 is retained by the cover 38 by the bearing ring 40 being clamped between the cover 38 and the carrier element 14.

A hydraulic chamber 41 which is formed between the lower side of the vibration damper 16 and the cover 38 and in which the flow channel 24 opens is sealed via the bearing ring 40.

In order to limit a freedom of movement of a vehicle unit 11, a stop system 42 is provided. This is necessary so that the vehicle unit 11 does not strike adjacent components during travel operation.

In the embodiment shown, the bearing core 18 is part of the stop system 42, wherein the bearing core 18 can strike the carrier element 14. Such a stop system 42 has the advantage that no additional components are required to form the stop system 42. Consequently, the fastening subassembly 10 may be particularly cost-effective. Only a suitable geometry for the bearing core 18 has to be selected.

In FIG. 1, the bearing core 18 is cross-shaped when viewed as a longitudinal section. However, other suitable geometries are also conceivable. For example, the bearing core 18 may be T-shaped in section, as illustrated in FIG. 6b.

In order to seal the fastening subassembly 10, in particular the flow channel 24, in an outward direction, a seal 44 is arranged between the cover 38 and the bearing ring 40.

Figure 2:
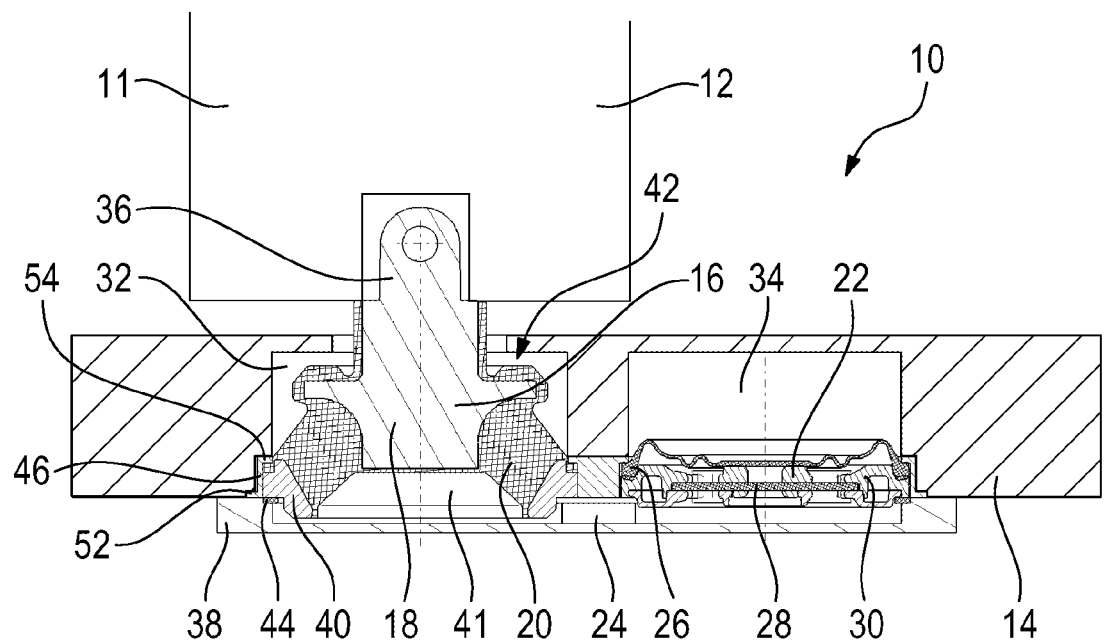
FIGS. 2 to 5 show in each case other embodiments of a vehicle unit fastening subassembly according to the invention.

FIG. 2 is a sectioned illustration of another embodiment of a vehicle unit fastening subassembly 10 according to the invention.

In contrast to the embodiment shown in FIG. 1, the vibration damper 16 and the hydraulic unit 22 are not arranged directly in the carrier element 14, but are instead pre-assembled in a separate inner housing 46. The handling during assembly can thereby be simplified.

The housing 46 is constructed in a disk-like manner and has two recesses for receiving the vibration damper 16 and the hydraulic unit 22.

Furthermore, the housing 46 has a peripheral collar 52 which extends radially outward. This acts as a stop in order to mount the housing 46 in a defined position on the carrier element 14.

In addition, there is provided a radially inwardly protruding collar 54 which acts as a stop for the vibration damper 16 and the hydraulic unit 22. The vibration damper 16 and the hydraulic unit 22 can consequently be inserted in a simple manner into the housing 46.

The pre-assembled unit can again be secured by the cover 38 to the carrier element 14 and be inserted into one of the carrier elements.

Figure 3:
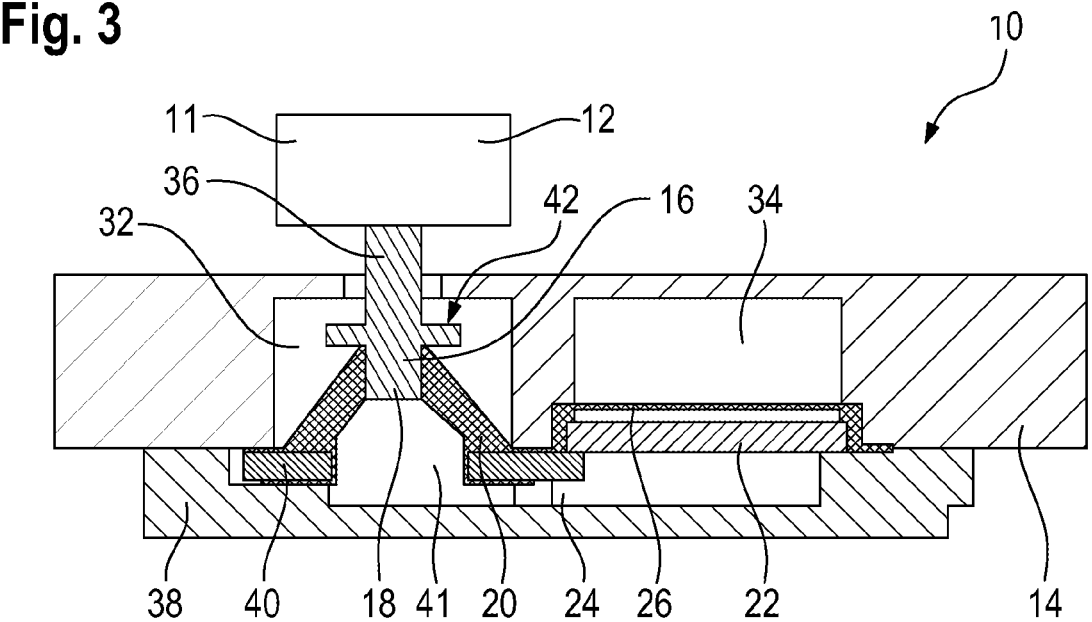

FIG. 3 is a schematic sectioned illustration of another embodiment of a vehicle unit fastening subassembly 10 according to the invention. The vehicle unit fastening subassembly 10 is similar to the vehicle unit fastening subassembly 10 according to FIG. 1.

In the embodiment according to FIG. 3, however, the bearing ring 40 is covered at the contact faces 56, 58 thereof directed toward the carrier element 14 and the cover 38 at least partially by the material of the suspension spring 20. This has the advantage that an additional seal 44 can be dispensed with since the material of the suspension spring 20 which is arranged on the bearing ring 40 ensures adequate sealing.

Alternatively or additionally, the rolling bellows 26 may be formed at the same time by the material of the suspension spring 20 so that the rolling bellows 26 is integral with the suspension spring 20. This is illustrated in FIG. 3.

Figure 4:
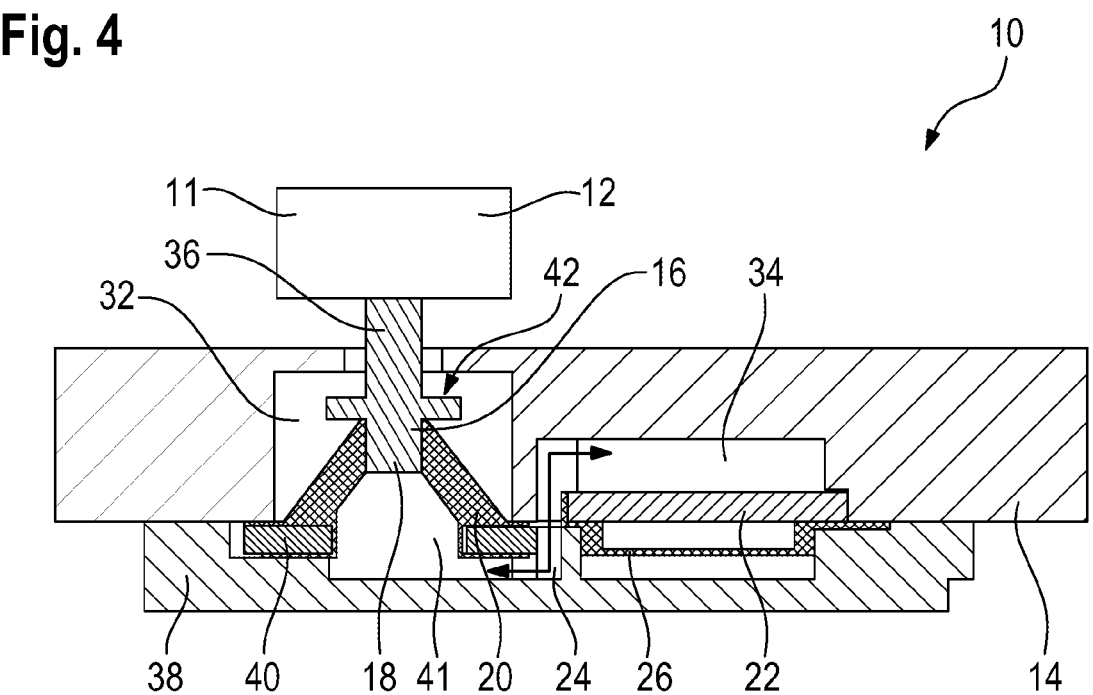

FIG. 4 is a schematic sectioned illustration of another embodiment of a vehicle unit fastening subassembly 10 according to the invention.

In contrast to the embodiments shown above, the flow channel 24 has between the vibration damper 16 and the hydraulic unit 22 a stop 60. The hydraulic unit 22 may thereby be subjected to flow from a different side in relation to the vibration damper 16.

In another embodiment which is not illustrated for the sake of clarity, the hydraulic unit 22 can in comparison with the hydraulic units shown in FIGS. 1 to 3 be arranged in an inclined manner, in particular tilted through 90°. In this manner, the vehicle unit fastening subassembly 10 may be adapted to different structural space situations.

Figure 5:
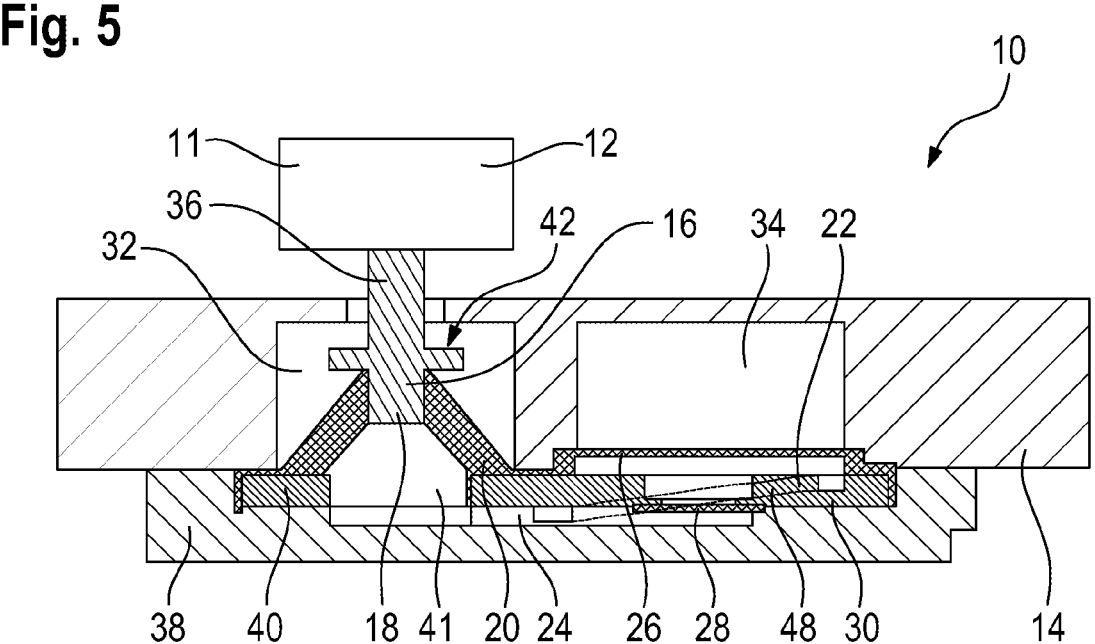

FIG. 5 is a schematic sectioned illustration of another embodiment of a vehicle unit fastening subassembly 10 according to the invention.

In contrast to the embodiments shown above, the bearing ring 40 and the cover 38 are formed in such a manner that they together represent a nozzle plate 30 with a nozzle channel 48. In this instance, the bearing ring 40 forms a first portion and the cover 38 forms a second portion of the nozzle plate 30.

The nozzle plate 30 can thereby be integrated in already-provided components, whereby the vehicle unit fastening subassembly 10 can be constructed in a particularly cost-effective manner.

Figure 6A:
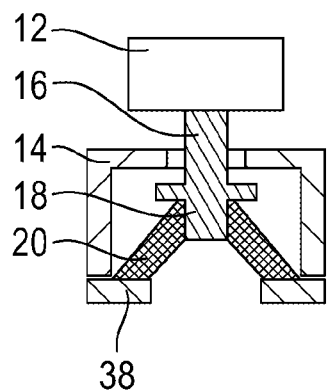
FIGS. 6a to 6c show different vibration dampers of the vehicle unit fastening subassembly according to the invention.
Figure 6B:
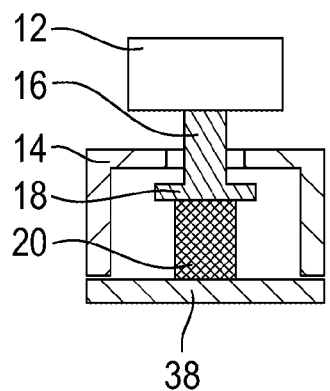
Figure 6C:
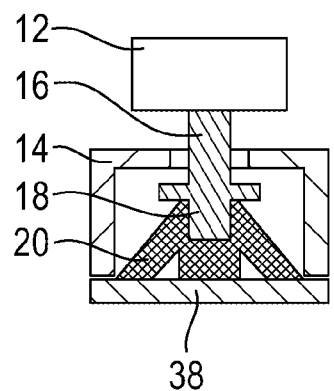

FIGS. 6a to 6c are schematically simplified sectioned illustrations of different possible forms of a vibration damper 16, in particular a bearing core 18 and a suspension spring 20.

The bearing cores 18 according to FIGS. 6a and 6c are cross-shaped in section whilst the bearing core 18 according to FIG. 5b is T-shaped. The suspension spring 20 is in each case arranged in an appropriate manner on the bearing core 18.

Figure 7:
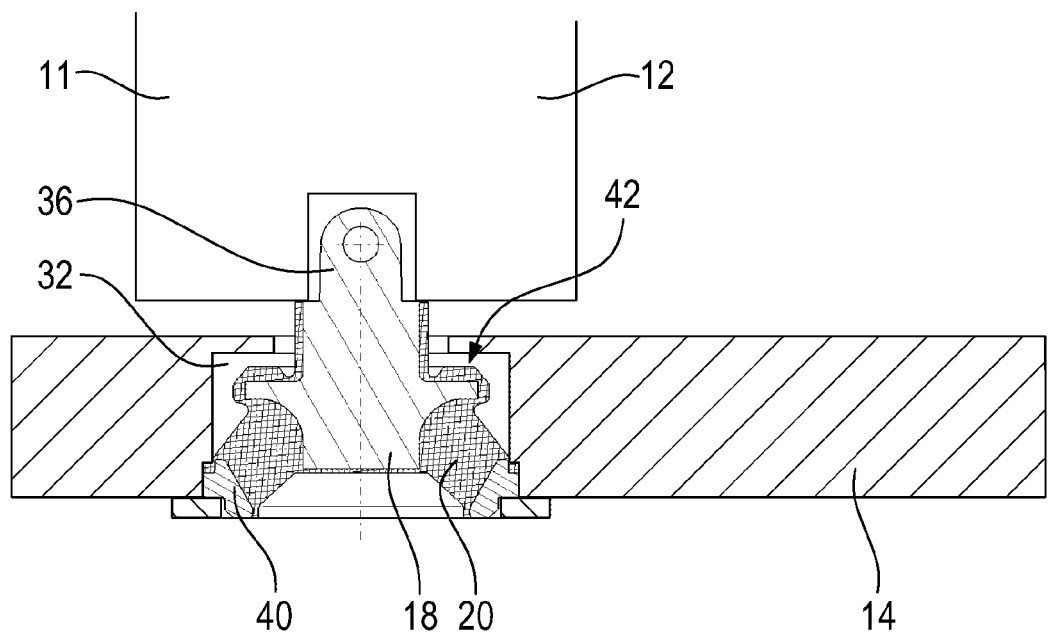
FIG. 7 shows a vibration damper in a conventional bearing.

FIG. 7 shows the vibration damper 16 from FIG. 1 in a carrier, wherein the vibration damper 16 is mounted without a hydraulic unit 22. Without the hydraulic unit 22, the vibration damper 16 acts as a conventional bearing.

The vibration damper 16 can consequently be a component of a modular system and optionally be used together with the hydraulic unit 22 as a hydraulic vibration damper or without the hydraulic unit 22 as a conventional bearing.

What is claimed is:

1. A vehicle unit fastening subassembly for vibratory fastening of a vehicle unit in a vehicle structure of a motor vehicle, comprising:
    a unit-side first carrier element;
    a vehicle-side second carrier element;
    a vibration damper; wherein the first carrier element and the second carrier element are connected to each other by the vibration damper;
    a hydraulic unit; and
    a flow channel fluidically connecting the vibration damper to the hydraulic unit, wherein
    the hydraulic unit, when the vibration damper is viewed from above, is arranged adjacent the vibration damper, and
    the vehicle-side second carrier element is an engine mount or a transmission cross member, wherein
        the vibration damper and the hydraulic unit are mounted together in a separate housing which is secured to one of the carrier elements.

2. The vehicle unit fastening subassembly according to claim 1, wherein
    the vibration damper comprises a bearing core and a suspension spring.

3. The vehicle unit fastening subassembly according to claim 2, wherein
    the suspension spring at least partially surrounds the bearing core.

4. The vehicle unit fastening subassembly according to claim 2, wherein
    the bearing core is part of a stop system, wherein the bearing core can strike at least one of the two carrier elements.

5. The vehicle unit fastening subassembly according to claim 4, wherein
    the bearing core is cross-shaped or T-shaped when viewed as a longitudinal section.

6. The vehicle unit fastening subassembly according to claim 1, wherein
    the carrier element which receives the vibration damper has two adjacent recesses,
    the vibration damper and the hydraulic unit are received in an associated recess in each case, and
    the recesses are covered at least at one side by a cover which, together with the associated carrier element, forms at least a portion of the flow channel.

7. The vehicle unit fastening subassembly according to claim 1, wherein
    the vibration damper is supported by a bearing ring on the carrier element or a separate housing.

8. The vehicle unit fastening subassembly according to claim 1, wherein
    the flow channel extends in a substantially linear manner between the vibration damper and the hydraulic unit.

9. The vehicle unit fastening subassembly according to claim 1, wherein
    the flow channel has a step between the vibration damper and the hydraulic unit.

10. A modular system, comprising:
    the vibration damper and the hydraulic unit according to claim 1, wherein
    the vibration damper is optionally used together with the hydraulic unit as a vehicle unit fastening subassembly, or without the hydraulic unit as a bearing for securing the vehicle unit to the vehicle structure.

* * * * *